United States Patent [19]

Anderson

[11] Patent Number: 4,878,829

[45] Date of Patent: Nov. 7, 1989

[54] FUEL JET BURNER AND COMBUSTION METHOD

[75] Inventor: John E. Anderson, Somers, N.Y.

[73] Assignee: Union Carbide Corporation, Danbury, Conn.

[21] Appl. No.: 190,396

[22] Filed: May 5, 1988

[51] Int. Cl.$^4$ .............................................. F23C 5/00
[52] U.S. Cl. ........................................ 431/8; 431/187; 239/423
[58] Field of Search ................. 431/8, 9, 181, 187; 239/423, 424, 424.5

[56] References Cited

U.S. PATENT DOCUMENTS

| | | | |
|---|---|---|---|
| 2,941,587 | 6/1960 | Hagy et al. | 158/99 |
| 3,132,683 | 5/1964 | Meyer | 158/28 |
| 3,905,751 | 9/1975 | Hemsath et al. | 431/183 |
| 4,023,921 | 5/1977 | Anson | 431/9 |
| 4,181,491 | 1/1980 | Hovis | 431/187 |
| 4,378,205 | 3/1983 | Anderson | 431/5 |
| 4,431,400 | 2/1984 | Kobayashi et al. | 431/6 |
| 4,488,682 | 12/1984 | Kobayashi et al. | 239/132.3 |
| 4,525,138 | 6/1985 | Snyder et al. | 431/187 |
| 4,541,796 | 9/1985 | Anderson | 431/187 |
| 4,541,798 | 9/1985 | Miller et al. | 431/266 |
| 4,622,007 | 11/1986 | Gitman | 432/13 |
| 4,693,680 | 9/1987 | Snyder et al. | 432/10 |

Primary Examiner—Margaret A. Focarino
Attorney, Agent, or Firm—Stanley Ktorides

[57] ABSTRACT

A burner and combustion method employing oxygen or oxygen-enriched air as the oxidant comprising a low velocity fuel stream in proximity to high velocity main fuel within a combustion zone enabling efficient combustion with a stable flame at very high fuel velocities.

22 Claims, 4 Drawing Sheets

FUEL JET BURNER AND COMBUSTION METHOD

TECHNICAL FIELD

This invention relates to post-mixed burners employing oxygen or oxygen-enriched air as the oxidant.

BACKGROUND ART

A post-mixed burner is a burner in which the fuel and oxidant are injected separately from the burner. The fuel and oxidant mix and react outside the burner. Most industrial furnaces use post-mixed burners.

A number of advantages can be identified using post-mixed burners in which oxidant, comprising pure oxygen or oxygen-enriched air, is supplied to the combustion zone as high velocity jets and the fuel gas is entrained into the oxidant jets. One such advantage is that the burner can be designed to be very flexible because a wide variety of flame patterns are possible. The heat transfer pattern in a furnace can be altered substantially just by changing the oxidant nozzle. Another advantage is that the circulation patterns brought about the high velocity oxidant jets result in uniform heating of the furnace. A third advantage is that the flame can be directed so as to increase the heat transfer rate to the workload. A further advantage is that mixing of the fuel and oxidant is enhanced so as to ensure complete combustion. Yet another advantage is that the formation of nitrogen oxides is reduced with high velocity jets due to the short contact at high flame temperatures within the jet.

A recent significant advance in the field of post-mixed burners is the aspirating burner and method developed by Dr. John E. Anderson which is disclosed and claimed in U.S. Pat. Nos. 4,378,205 and 4,541,796.

There are situations, however, when oxygen or oxygen-enriched air is not readily available at high pressure but is readily available at a lower pressure. One example of such a situation is the waste oxygen from a cryogenic air separation plant for producing nitrogen. In these situations, this oxidant cannot be employed at very high velocity in a combustion process. Therefore, in order to attain the advantages that would have been possible with use of high velocity oxidant, one could attempt to carry out combustion by injecting fuel into the combustion zone as high velocity jets and entraining oxidant into the high velocity fuel jets. The major problem with using high velocity fuel jets is that the combustion flame becomes unstable before a very high velocity can be employed.

It is desirable to have a post-mixed burner and method employing high velocity fuel jets wherein good flame stability is attained.

Accordingly, it is an object of this invention to provide a post-mixed burner and method employing oxygen or oxygen-enriched air as the oxidant wherein the fuel may be injected directly into the furnace zone at high velocity and wherein good flame stability is attained.

SUMMARY OF THE INVENTION

The above and other objects which will become apparent to one skilled in the art upon a reading of this disclosure are attained by the present invention, one aspect of which is:

A method for combusting gaseous fuel and oxidant comprising:

(A) injecting into a combustion zone the major portion of the gaseous fuel required for the combustion as at least one stream at a high velocity V which is greater than 5P where P is the volume percent oxygen in the oxidant and V is in feet per second;

(B) injecting into said combustion zone in proximity to the major fuel, a minor portion of the gaseous fuel required for the combustion, said minor portion comprising at least 1 percent of the total gaseous fuel injected into the combustion zone, at a low velocity less than 0.5 V;

(C) injecting oxidant, comprising at least 30 volume percent oxygen, into the combustion zone in proximity to the minor fuel to form an interface between said oxidant and said minor fuel, at a velocity such that the low velocity of the minor fuel is within 200 feet per second of the velocity of the oxidant at the interface;

(D) combusting minor fuel with oxidant at the interface;

(E) entraining minor fuel into the high velocity major fuel immediately after injection of the major fuel into the combustion zone, and thereafter entraining oxidant into the high velocity major fuel; and (F) drawing hot combustion products from the interface into the high velocity major fuel, said hot combustion products serving as a continuous source of ignition for the oxidant and major fuel, and combustion oxidant and high velocity major fuel in a stable flame.

Another aspect of the present invention is:

Burner apparatus for use with pure oxygen or oxygen-enriched air as the oxidant comprising:

(A) means for providing major fuel for injection into a combustion zone, said major fuel provision means comprising a central fuel supply tube and a nozzle at the injection end of the supply tube, said nozzle having at least one orifice therethrough for passage of gaseous fuel from the supply tube into the combustion zone;

(B) an annular opening around the nozzle for providing minor fuel to the combustion zone in proximity to the major fuel injection so that minor fuel is entrained into major fuel immediately after injection of major fuel into the combustion zone; and (C) means for providing oxidant to said combustion zone in proximity to the minor fuel provision means, said oxidant provision means connected by conduit means to a source of oxidant comprising at least 30 volume percent oxygen, so that said oxidant and minor fuel form an interface within the combustion zone prior to contact between oxidant and major fuel.

As used herein the term "combustion zone" means a volume in which fuel and oxidant mix and react to release heat.

As used herein, the term "pure oxygen" means a gas having an oxygen concentration of at least 99.5 volume percent.

As used herein, the term "interface" refers to the plane or space where the oxidant and the minor fuel interact. The interface has a finite thickness as the gaseous fuel diffuses into the oxidant and the oxidant diffuses into the gaseous fuel so as to form a combustible mixture.

As used herein, the term "gaseous fuel" means a fuel composed of one or more of the following: one or more gaseous components some or all of which are combustible; liquid fuel droplets dispersed in a gaseous medium; solid fuel particles dispersed in a gaseous medium. Specific examples of gaseous fuel include natural gas, hydrogen, coke oven gas, and propane.

As used herein, the term "apparent jet velocity" means the volumetric flow rate, at ambient pressure, leaving an orifice divided by the cross sectional area of the orifice.

DETAILED DESCRIPTION

The invention will be described in detail with reference to the Drawings.

Figures 1, 2, 3:
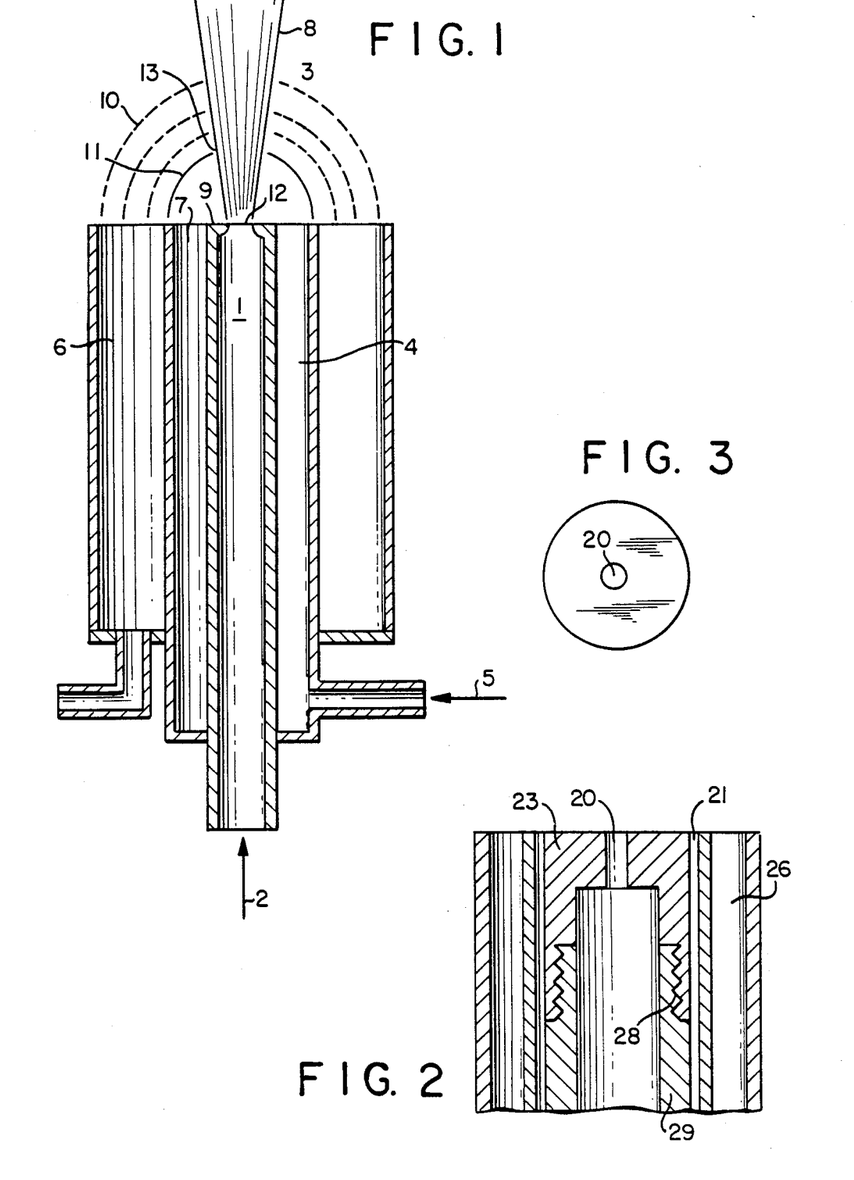
FIG. 1 is a cross-sectional view of one embodiment of the burner of this invention.
FIG. 2 is a cross-sectional view of a single-orifice nozzle set in a burner of this invention.
FIG. 3 is a head-on view of the fuel nozzle illustrated in FIG. 2.

Referring now to FIG. 1, passage 1 is connected by conduit means 2 to a source (not shown) of gaseous fuel. The fuel passes out of passage 1 through a nozzle 9 having one or more orifice openings 12 and into combustion zone 3.

FIG. 1 illustrates a preferred embodiment of the invention wherein the low velocity fuel stream proximate to the high velocity fuel stream is an annular stream which forms an annular envelope around the high velocity stream. However, the low velocity fuel stream need not completely surround the high velocity fuel stream. The annular stream could also comprise a number of low velocity jets from a number of holes rather than a continuous annular opening. Furthermore, if, for example, the high velocity fuel stream were not round but were a plane jet, the low velocity fuel stream could be an adjacent plane stream.

Referring back now to FIG. 1, coaxial to passage 1 is annular passage or opening 4 which is connected by conduit means 5 to a source (not shown) of gaseous fuel. Gaseous fuel passes out of annular passage 4 directly into combustion zone 3 and forms an envelope surrounding the fuel passing out of central passage 1 at, and for a short distance beyond, their respective injection points.

Oxidant comprising at least 30 volume percent oxygen is provided to combustion zone 3 by means separate from the fuel passages so that at the start of the combustion zone, the oxidant is proximate to the low velocity fuel stream. In the embodiment illustrated in FIG. 1, oxidant is provided directly to the combustion zone 3 through passage 6 which is coaxial and next to the outer surface of the low velocity fuel annular stream at their respective injection points. Passage 6 is connected by conduit means to a source (not shown) of pure oxygen or oxygen-enriched air comprising at least 30 volume percent oxygen. Sources of oxygen include, for example, a gas storage cylinder, a liquid oxygen tank form which oxygen is vaporized prior to use and, for larger requirements, an air separation plant such as a cryogenic rectification plant or a pressure swing adsorption plant. Oxygen-enriched air may also be produced by combining high purity oxygen with air and passing the combined stream to oxidant passage 6.

Passage 1 carries the major portion of the gaseous fuel necessary for combustion with the oxidant, and coaxial passage 4 carries the minor portion or the remainder of the total fuel. The minor fuel comprises at least 1 percent of the total fuel supplied to the combustion zone. Preferably the minor fuel comprises less than 10 percent of the total fuel supplied to the combustion zone.

The major fuel is injected into combustion zone 3 from passage 1 as a high velocity jet 8 with a velocity V at the exit orifice 12 greater than 5P, where V is velocity in ft/sec and P is the volume percent oxygen in the oxidant.

The minor fuel is injected into the combustion zone 3 from annular passage or opening 4 at a low velocity less than 0.5 V such that the low velocity of the minor fuel is within 200 feet per second of the velocity of the oxidant at their interface. Preferably the velocity of the minor fuel is less than 100 ft/sec.

Referring again to FIG. 1, a low velocity stream of fuel flows from exit 7 at the end of passage 4. This low velocity stream forms an envelope around the high velocity jet 8 of the major fuel exiting orifice 12 at the end of passage 1. The high velocity jet from orifice 12 entrains surrounding gases as it passes through combustion zone 3. The first gas entrained after leaving the nozzle is the low velocity annulus stream of fuel which is entrained into the major fuel immediately after injection of the major fuel into the combustion zone. This is followed by the entrainment of oxidant. The flow lines for the oxidant being entrained into the fuel jet 8 are represented by the dotted lines 10 in FIG. 1. A combustion interface 11 is formed between the low velocity fuel stream and the oxidant as both streams are drawn into the high velocity fuel jet. Ignition of the oxidant and low velocity fuel is initiated by any suitable ignition means. Since the annulus stream of the minor fuel is moving at a low velocity relative to the oxidant, a stable flame can be maintained at the interface 11. The hot combustion products from this flame are drawn into the jet at point 13, generally less than a distance equal to 6 times the diameter of orifice 12 in nozzle 9, and before any substantial dilution of the major fuel by furnace gases can occur. This is the exact point where oxidant is starting to be drawn into the high velocity fuel jet and starts mixing with the major fuel. For the embodiment of the invention as shown in FIG. 1, the intersection 13 is a circle around the periphery of the fuel jet. The hot combustion products from the annulus fuel-oxidant flame serve as a continuous source of ignition at the intersection point 13 wherein the oxidant and major fuel first meet. This is the ideal location for ignition. This continuous source of ignition prior to any substantial dilution of the major fuel by furnace gases, makes it possible to maintain stable combustion with the oxidant and fuel at the interface of the high velocity fuel jet 8. This is accomplished without changing the integrity of the jet of major fuel.

Figures 4, 6:
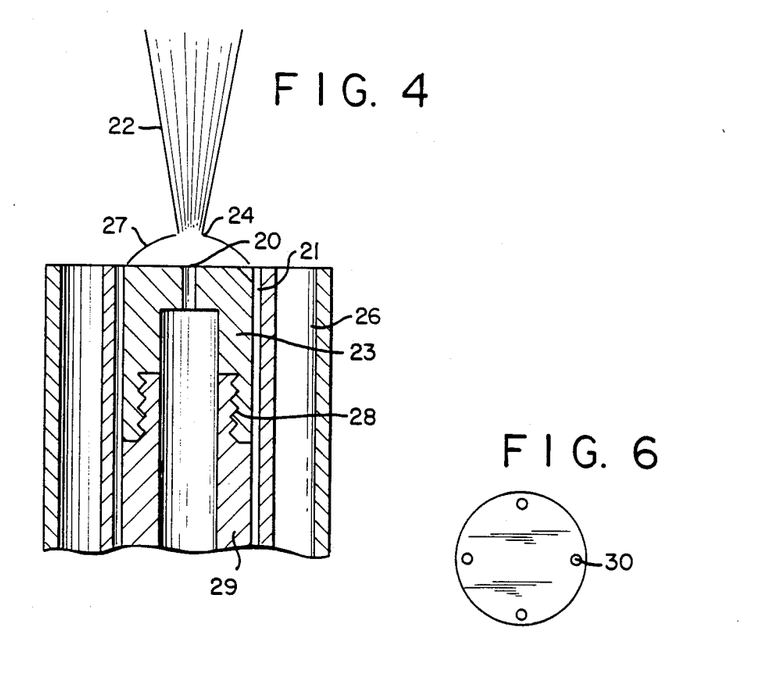
FIG. 4 is an illustration of the flame obtained from the practice of this invention using the burner illustrated in FIG. 2.
FIG. 6 is a head-on view of the fuel nozzle illustrated in FIG. 5.

FIGS. 2-4 illustrate the embodiment of the invention in a burner using a single orifice for the high velocity fuel. The fuel nozzle is shown separately in FIG. 3 and is shown incorporated into the burner in FIGS. 2 and 4. The flame is illustrated in FIG. 4. Referring to FIG. 4, the high velocity fuel is injected through the single orifice 20 while the low velocity fuel is injected through the annulus passage 21. Oxidant is injected into the combustion zone through passage 26. As the low velocity fuel and oxidant are entrained into the high velocity fuel jet 22, a stable flame is formed at the interface 27 with the low velocity fuel on one side and oxidant on the other side. This flame at the interface forms an envelope around the nozzle meeting the high velocity fuel jet 22 at point 24. This point is where oxidant is first drawn into the high velocity fuel jet. Continuous ignition between the oxidant and major fuel is established and maintained at point 24 by the supply of hot combustion products from the flame at interface 27. Nozzle 23 is removeable and is screwed into the fuel supply tube 29 at threads 28. In this way the major fuel nozzle can be easily replaced and the burner altered to operate in a different mode as desired.

Figure 5:
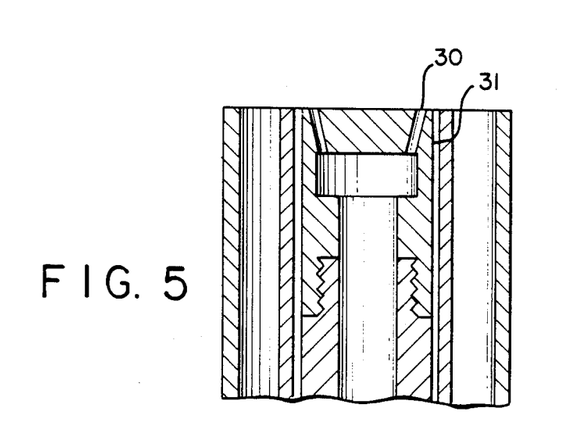
FIG. 5 is a cross-sectional view of a multiple-orifice nozzle set in a burner of this invention.

In a preferred embodiment of the invention, the high velocity fuel is injected into the combustion zone through a plurality of small diameter orifices. With a single, large diameter orifice, the high velocity jet entrains the oxidant over an extended distance and the entrainment near the high velocity fuel orifice may be insufficient to overcome buoyancy and natural convection forces. As a result, oxidant can escape the high velocity fuel jet and remain unreacted. FIGS. 5 and 6 illustrate the embodiment of the invention in a burner using four orifices for the high velocity fuel. The fuel nozzle is shown separately in FIG. 6 and is shown incorporated into the burner in FIG. 5. As illustrated in FIG. 5, the four orifices 30 are angled out from the burner axis so that the high velocity fuel jets do not interfere with each other. By changing the single orifice nozzle 23 in FIG. 4 with the nozzle 31 in FIG. 5 containing four orifices, the entrainment of the oxidant occurs closer to the high velocity fuel orifice and the tendency to forego oxidant reaction due to buoyancy and natural convection forces is greatly reduced. In this preferred embodiment of the invention, it is particularly preferred that there be more than three orifices for the high velocity fuel and that each orifice be less than ¼ inch in diameter.

Figure 7:
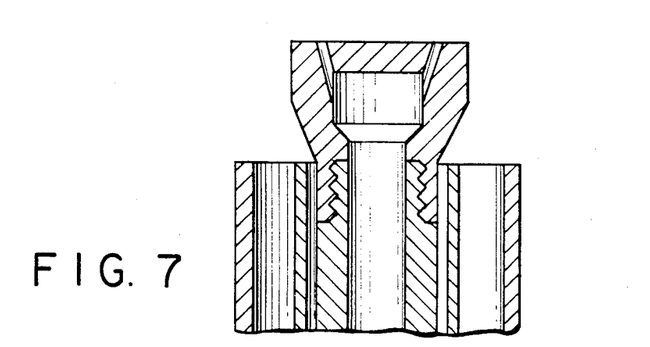
FIG. 7 is a cross-sectional view of another multiple-orifice nozzle set in a burner of this invention.
Figure 8:
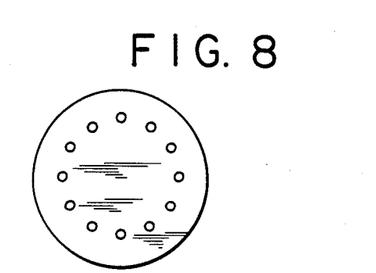
FIG. 8 is a head-on view of the fuel nozzle illustrated in FIG. 7.
Figures 9, 11:
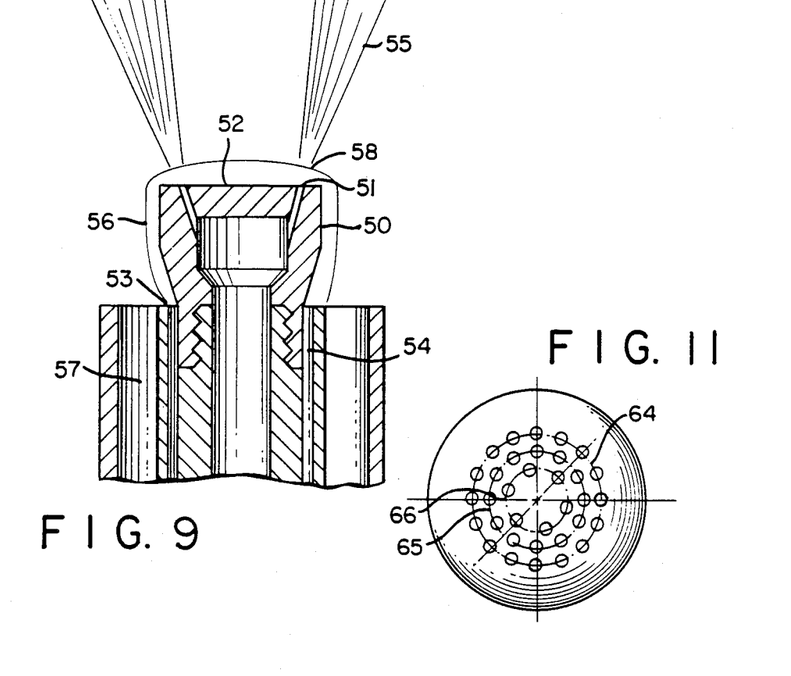
FIG. 9 is an illustration of the flame obtained from the practice of this invention using the burner illustrated in FIG. 7.
FIG. 11 is a head-on view of the fuel nozzle illustrated in FIG. 10.

Another embodiment of the invention is shown in FIGS. 7, 8, and 9. The fuel nozzle is shown separately in FIG. 8 and is shown incorporated into the burner in FIGS. 7 and 9. The flame is illustrated in FIG. 9. The single orifice nozzle 23 in FIG. 4 is replaced by a multi-orifice nozzle 50 as shown in FIG. 9. Twelve orifices 51 are evenly spaced around a circle on the face of the nozzle 52. The orifices are angled out from the axis of the burner. In order to accommodate the orifices with adequate spacing between adjacent orifices, the nozzle is extended beyond exit 53 of the annulus fuel passage 54 and enlarged to provide greater area for the nozzle face 52. In this embodiment of the invention, the low velocity annulus stream of fuel leaving exit 53 flows along the periphery of the nozzle 50 before being entrained into the high velocity jets 55 of the major fuel. The flame at the interface 56 of the low velocity fuel and the oxidant forms an envelope around the portion of the nozzle extending into the combustion zone. Continuous ignition of the oxidant from passage 57 and the high velocity fuel jets 55 is provided at the point 58 where the oxidant-annulus fuel interface 56 intersects with the high velocity jets 55.

In a preferred embodiment of the invention, the orifices 51 are angled out from the burner axis by more than 10 degrees.

Figure 10:
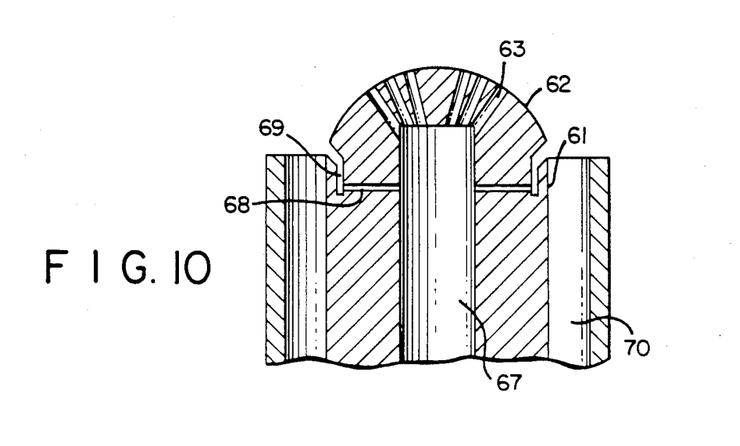
FIG. 10 is a cross-sectional view of another multiple-orifice nozzle set in a burner of this invention.

Another embodiment of the invention is shown in FIGS. 10 and 11. The fuel nozzle is shown separately in FIG. 11 and is shown incorporated into the burner in FIG. 10. The fuel nozzle 61 has a spherical surface 62. The orifices 63 for the high velocity fuel jets are drilled perpendicular to this surface towards the center of the sphere. The orifices are located on three concentric circles 64, 65, and 66 with a common center as shown in FIG. 11. Gaseous fuel to the orifices is supplied through passage 67. A small portion of the fuel, between 1 and 10 percent of the total fuel, is withdrawn from passage 67 through bleed passages 68 to the annular passage 69. Oxidant is supplied through passage 70 surrounding the nozzle. The fuel existing passage 69 provides the low velocity fuel stream required to stabilize the flame around the high velocity fuel jets from orifices 63. The stream of fuel from annular passage 69 flows along the spherical surface prior to being entrained into the high velocity jets. The flame at the interface of the annular fuel stream and the oxidant forms an envelope around the spherical surface of the nozzle.

Figure 12:
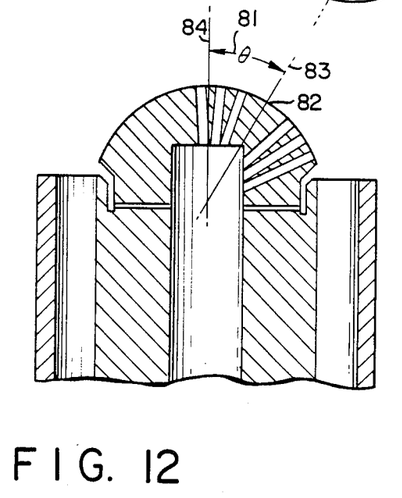
FIG. 12 is a cross-sectional view of another multiple-orifice nozzle set in a burner of this invention.
Figure 13:
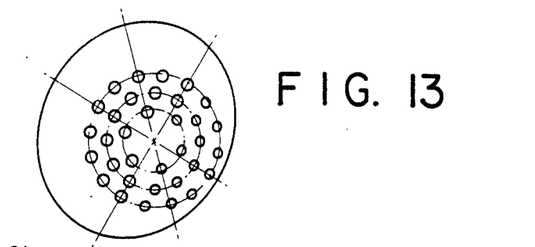
FIG. 13 is a head-on view at an angle of 30 degrees relative to the burner axis for the fuel nozzle illustrated in FIG. 12.

The common center for the concentric circles in FIG. 11 is located along the axis of the burner. The invention can also be practiced with the center of the concentric circles at a point removed from the axis as shown in FIGS. 12 and 13. The fuel nozzle is shown separately in FIG. 13 and is shown incorporated into the burner in FIG. 12. A line 83 is shown in FIG. 12 at an angle 81 with a line 84 drawn through the burner axis. Line 83 intersects the nozzle surface at point 82. The concentric circles for locating the orifices on the nozzle surface have a common center on the line 83. The low velocity fuel annulus stabilizes the flames around the high velocity fuel jets in the same manner as described for the burner configuration in FIGS. 10 and 11. The flame pattern is determined by the direction of the high velocity fuel jets. When the invention is practices as shown in FIGS. 12 and 13, the jet flames are then angled away from the burner axis. In this way, the nozzle can be changed to obtain the same effect as angling the whole burner.

The invention can also be practiced with multi-orifice nozzles with an asymmetric hole pattern.

The following Example serves to further illustrate the present invention or to provide comparative results, and is presented for illustrative purposes and is not intended to be limiting.

EXAMPLE

A burner, similar to that illustrated in FIG. 1, was employed to combust fuel and oxidant injected into a combustion zone. The fuel was natural gas and the oxidant was pure oxygen. The fuel was injected into the combustion zone through a nozzle having a single orifice, 1/16 inch diameter. The burner was operated with and without the low velocity annulus fuel. Without the fuel flow to the annulus, the flame was stable up to the fuel flowrate of 66 cubic feet per hour (CFH) corresponding to a jet velocity of 860 ft/sec at the nozzle. When the fuel flowrate was increased further, the flame became detached from the nozzle, an unstable condition for practical applications. The procedure was repeated with fuel flow through the annulus at a flowrate of 4.2 CFH corresponding to a stream velocity of 1.7 ft/sec. As the fuel flowrate to the nozzle was increased, the flame remained stable and attached to the nozzle up to a flowrate of 220 CFH corresponding to an apparent jet velocity of 2880 ft/sec at the nozzle. This was the highest flow rate that could be obtained through the flow lines at the available fuel pressure. The oxygen flowrate was 350 CFH corresponding to a stream velocity of 7.4 ft/sec. When the flow of fuel to the annulus was shut off, the flame became detached from the nozzle and was noisy and unstable. The small flow of fuel to the annulus increased the flowrate of fuel that could be passed through the nozzle, while maintaining a stable flame attached to the nozzle, by more than three fold.

Now by the use of the burner and method of this invention one can carry out efficient and stable combustion at very high fuel velocity using oxygen or oxygen-enriched air as the oxidant.

Although the invention has been discussed in detail with reference to certain specific embodiments, those skilled in the art will recognize that there are other embodiments of this invention within the spirit and scope of the claims.

I claim:

1. A method for combusting gaseous fuel and oxidant comprising:
   (A) injecting into a combustion zone the major portion of the gaseous fuel required for the combustion as at least one stream at a high velocity V which is greater than 5P where P is the volume percent oxygen in the oxidant and V is in feet per second;
   (B) injecting into said combustion zone in proximity to the major fuel, a minor portion of the gaseous fuel required for the combustion, said minor portion comprising at least 1 percent of the total gaseous fuel injected into the combustion zone, at a low velocity less than 0.5 V;
   (C) injecting oxidant, comprising at least 30 percent oxygen, into the combustion zone in proximity to the minor fuel to form an interface between said oxidant and said minor fuel, at a velocity such that the low velocity of the minor fuel is within 200 feet per second of the velocity of the oxidant at the interface;
   (D) combusting minor fuel with oxidant at the interface;
   (E) entraining minor fuel into the high velocity major fuel immediately after injection of the major fuel into the combustion zone and thereafter entraining oxidant into the high velocity major fuel; and
   (F) drawing hot combustion products from the interface into the high velocity major fuel, said hot combustion products serving as a continuous source of ignition for the oxidant and major fuel, and combusting oxidant and high velocity major fuel in a stable flame.

2. The method of claim 1 wherein the oxidant is pure oxygen.

3. The method of claim 1 wherein said low velocity is not more than 100 feet per second.

4. The method of claim 1 wherein the fuel injected into the combustion zone at low velocity comprises less than 10 percent of the total fuel injected into the combustion zone.

5. The method of claim 1 wherein the low velocity fuel stream is injected into the combustion zone as an annular stream around the high velocity fuel so as to form a low velocity annular envelope around said high velocity fuel.

6. The method of claim 1 wherein the minor fuel is provided by a bleed from the major fuel.

7. The method of claim 1 wherein the high velocity major fuel is injected into the combustion zone as a plurality of separate fuel streams.

8. The method of claim 7 wherein the high velocity major fuel is injected into the combustion zone as at least one more axially directed jet and as at least one more radially directed jet wherein the more radially directed jet is oriented at least 10 degrees outward from the more axially directed jet.

9. The method of claim 1 wherein the high velocity major fuel is injected into the combustion zone through one or more orifices having a diameter less that 0.25 inch.

10. The method of claim 1 wherein the high velocity major fuel is injected into the combustion zone downstream of the point where the low velocity minor fuel is injected into the combustion zone.

11. Burner apparatus for use with pure oxygen or oxygen-enriched air as the oxidant comprising:
    (A) means for providing major fuel for injection into a combustion zone said major fuel provision means comprising a central fuel supply tube and a nozzle at the injection end of the supply tube, said nozzle having at least one orifice therethrough for passage of gaseous fuel from the supply tube into the combustion zone;
    (B) an annular opening around the nozzle for providing minor fuel to the combustion zone in proximity to the major fuel injection so that minor fuel is entrained into major fuel immediately after injection of major fuel into the combustion zone, said annular opening connected by conduit means to a source of gaseous fuel; and
    (C) means for providing oxidant to said combustion zone in proximity to the minor fuel provision means, said oxidant provision means connected by conduit means to a source of oxidant comprising at least 30 volume percent oxygen, so that said oxidant and minor fuel form an interface within the combustion zone prior to contact between oxidant and major fuel.

12. The burner of claim 11 wherein said major fuel provision means comprises a nozzle having a plurality of orifices.

13. The burner of claim 12 wherein said plurality of orifices are directed toward the combustion zone parallel to each other.

14. The burner of claim 12 wherein said plurality of orifices are each directed toward the combustion zone at diverging angles from each other.

15. The burner of claim 12 wherein each orifice has a diameter less than 0.25 inch.

16. The burner of claim 11 wherein said major fuel provision means comprises a removeable nozzle.

17. The burner of claim 16 wherein said removeable nozzle can be screwed into and out of the head of the burner.

18. The burner of claim 11 further comprising at least one bleed hole through the central fuel supply tube enabling gaseous fuel to pass from the major fuel provision means into the annular opening.

19. The burner of claim 11 wherein the major fuel provision means provides major fuel into the combustion zone downstream of the point where the annular opening provides minor fuel into the combustion zone.

20. The burner of claim 11 wherein the nozzle has a spherical surface.

21. The burner of claim 20 having a plurality of orifices through the spherical nozzle part, perpendicular to the spherical surface towards the center of the sphere and centrally oriented with respect to the burner axis.

22. The burner of claim 20 having a plurality of orifices through the spherical nozzle part, perpendicular to the spherical surface towards the center of the sphere, and offset with respect to the burner axis.

* * * * *

UNITED STATES PATENT AND TRADEMARK OFFICE
CERTIFICATE OF CORRECTION

PATENT NO. : 4,878,829

DATED : November 7, 1989

INVENTOR(S) : J. E. Anderson

It is certified that error appears in the above-identified patent and that said Letters Patent is hereby corrected as shown below:

In column 1, line 24 after "about" insert --by--.

In column 2, line 29, delete "combustion" and insert therefor --combusting--.

In column 4, line 11 delete "form" and insert therefor --from--.

In column 6, line 27 delete "existing" and insert therefor --exiting--.

Signed and Sealed this

Eighteenth Day of September, 1990

Attest:

HARRY F. MANBECK, JR.

*Attesting Officer*          *Commissioner of Patents and Trademarks*